United States Patent
Brown et al.

(10) Patent No.: US 8,144,850 B2
(45) Date of Patent: *Mar. 27, 2012

(54) LOGGING CALLS ACCORDING TO CALL CONTEXT

(75) Inventors: Michael W. Brown, Georgetown, TX (US); Joseph H. McIntyre, Austin, TX (US); Michael A. Paolini, Austin, TX (US); James M. Weaver, Austin, TX (US); Scott L. Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 12/237,067

(22) Filed: Sep. 24, 2008

(65) Prior Publication Data

US 2009/0016506 A1 Jan. 15, 2009

Related U.S. Application Data

(63) Continuation of application No. 10/022,624, filed on Dec. 17, 2001, now Pat. No. 7,443,970.

(51) Int. Cl.
*H04M 15/00* (2006.01)
(52) U.S. Cl. .............. 379/121.04; 379/112.06
(58) Field of Classification Search ............ 379/207.15, 379/121.04, 112.06
See application file for complete search history.

(56) References Cited

U.S. PATENT DOCUMENTS

| | | |
|---|---|---|
| 64,264 A | 8/1901 | Lung et al. |
| 4,706,275 A | 11/1987 | Kamil |
| 4,788,715 A | 11/1988 | Lee |
| 4,953,204 A | 8/1990 | Cuschleg et al. |
| 5,014,298 A | 5/1991 | Katz |
| 5,018,191 A | 5/1991 | Catron et al. |
| 5,020,095 A | 5/1991 | Morganstein et al. |
| 5,148,474 A | 9/1992 | Haralambopoulos et al. |
| 5,164,983 A | 11/1992 | Brown et al. |
| 5,206,899 A | 4/1993 | Gupta |
| 5,276,731 A | 1/1994 | Arbel et al. |
| 5,283,833 A | 2/1994 | Church et al. |

(Continued)

FOREIGN PATENT DOCUMENTS

EP 0585004 A2 3/1994

(Continued)

OTHER PUBLICATIONS

Office Action Dated Mar. 24, 2010 in U.S. Appl. No. 11/554,269.

(Continued)

*Primary Examiner* — Simon Sing

(74) *Attorney, Agent, or Firm* — Brevetto Law Group

(57) ABSTRACT

A method, system, and program for logging calls according to call context are provided. A context for a call is detected, where the context include information such as the parties to a call, whether a backup party is accessed, where the call is on behalf of another, the locations of the parties to the call, the subject matter of the call, tariffs applied during the call, billing for telephone services accessed during the call, and orders placed during the call. At least one context based logging request valid for the context for the call is accessed from among multiple context based logging requests stored for multiple parties. Parties requesting logging may include parties to the call, on behalf of parties, third parties, and guardians. The context is logged according to the context based logging request.

44 Claims, 8 Drawing Sheets

U.S. PATENT DOCUMENTS

| | | | |
|---|---|---|---|
| 5,303,042 A | 4/1994 | Lewis et al. | |
| 5,325,421 A | 6/1994 | Hou et al. | |
| 5,329,576 A | 7/1994 | Handforth | |
| 5,369,699 A | 11/1994 | Page et al. | |
| 5,381,467 A | 1/1995 | Rosinski | |
| 5,414,755 A | 5/1995 | Bahler et al. | |
| 5,444,774 A | 8/1995 | Friedes | |
| 5,479,488 A | 12/1995 | Lennig et al. | |
| 5,497,414 A | 3/1996 | Bartholomew | |
| 5,499,288 A | 3/1996 | Hunt et al. | |
| 5,506,898 A | 4/1996 | Costantini | |
| 5,511,112 A | 4/1996 | Szlam | |
| 5,533,109 A | 7/1996 | Baker | |
| 5,533,115 A | 7/1996 | Hollenbach et al. | |
| 5,535,256 A * | 7/1996 | Maloney et al. | 379/309 |
| 5,557,658 A | 9/1996 | Gregorek et al. | |
| 5,561,707 A | 10/1996 | Katz | |
| 5,566,229 A | 10/1996 | Hou et al. | |
| 5,568,541 A | 10/1996 | Greene | |
| 5,590,188 A | 12/1996 | Crockett | |
| 5,594,784 A | 1/1997 | Velius | |
| 5,602,907 A | 2/1997 | Hata | |
| 5,623,539 A | 4/1997 | Bassenyemukasa et al. | |
| 5,646,839 A | 7/1997 | Katz | |
| 5,646,988 A | 7/1997 | Hikawa | |
| 5,652,786 A | 7/1997 | Rogers | |
| 5,652,789 A | 7/1997 | Miner | |
| 5,655,007 A | 8/1997 | McAllister | |
| 5,673,404 A | 9/1997 | Cousins et al. | |
| 5,694,459 A | 12/1997 | Backaus et al. | |
| 5,696,880 A | 12/1997 | Gustafson et al. | |
| 5,715,298 A | 2/1998 | Rogers | |
| 5,754,633 A | 5/1998 | Levy | |
| 5,757,904 A | 5/1998 | Anderson | |
| 5,761,288 A | 6/1998 | Pinard | |
| 5,771,279 A | 6/1998 | Cheston et al. | |
| 5,774,534 A | 6/1998 | Mayer | |
| 5,790,637 A | 8/1998 | Johnson et al. | |
| 5,796,791 A | 8/1998 | Polcyn | |
| 5,802,526 A | 9/1998 | Fawcett et al. | |
| 5,805,680 A | 9/1998 | Penzias | |
| 5,806,045 A | 9/1998 | Biorge et al. | |
| 5,822,411 A | 10/1998 | Swale | |
| 5,825,857 A | 10/1998 | Reto | |
| 5,828,735 A | 10/1998 | Farfan | |
| 5,832,072 A | 11/1998 | Rozenblit | |
| 5,859,900 A | 1/1999 | Bauer | |
| 5,864,616 A | 1/1999 | Hartmeier | |
| 5,864,872 A | 1/1999 | Lee et al. | |
| 5,867,572 A | 2/1999 | MacDonald | |
| 5,870,456 A | 2/1999 | Rogers | |
| 5,872,834 A | 2/1999 | Teitelbaum | |
| 5,875,240 A | 2/1999 | Silverman | |
| 5,901,209 A | 5/1999 | Tannenbaum | |
| 5,915,001 A | 6/1999 | Uppaluru | |
| 5,933,828 A | 8/1999 | Eitel et al. | |
| 5,937,044 A | 8/1999 | Kim | |
| 5,940,476 A | 8/1999 | Morganstein et al. | |
| 5,943,405 A | 8/1999 | Morikawa | |
| 5,946,378 A | 8/1999 | Farfan | |
| 5,946,386 A | 8/1999 | Rogers et al. | |
| 5,946,388 A | 8/1999 | Walker et al. | |
| 5,946,654 A | 8/1999 | Newman et al. | |
| 5,948,061 A | 9/1999 | Merriman et al. | |
| 5,953,399 A | 9/1999 | Farris et al. | |
| 5,960,416 A | 9/1999 | Block | |
| 5,978,450 A | 11/1999 | McAllister et al. | |
| 5,978,467 A * | 11/1999 | Walker et al. | 379/266.01 |
| 5,982,857 A | 11/1999 | Brady | |
| 5,991,364 A | 11/1999 | McAllister et al. | |
| 6,014,439 A | 1/2000 | Walker et al. | |
| 6,014,626 A | 1/2000 | Cohen | |
| 6,018,718 A | 1/2000 | Walker et al. | |
| 6,028,917 A | 2/2000 | Creamer et al. | |
| 6,038,305 A | 3/2000 | McAllister et al. | |
| 6,041,103 A | 3/2000 | La Porta et al. | |
| 6,046,762 A | 4/2000 | Sonesh et al. | |
| 6,047,051 A | 4/2000 | Ginzboorg | |
| 6,047,053 A | 4/2000 | Miner et al. | |
| 6,052,438 A | 4/2000 | Wu et al. | |
| 6,058,364 A | 5/2000 | Goldberg et al. | |
| 6,061,436 A | 5/2000 | Bauer | |
| 6,064,730 A | 5/2000 | Ginsberg et al. | |
| 6,067,347 A | 5/2000 | Farris et al. | |
| 6,087,574 A | 7/2000 | Kitashima et al. | |
| 6,088,435 A | 7/2000 | Barber et al. | |
| 6,088,444 A | 7/2000 | Walker et al. | |
| 6,091,968 A | 7/2000 | Koohgoli et al. | |
| 6,098,878 A | 8/2000 | Dent | |
| 6,101,242 A | 8/2000 | McAllister et al. | |
| 6,122,357 A | 9/2000 | Farris et al. | |
| 6,125,178 A | 9/2000 | Walker et al. | |
| 6,141,328 A | 10/2000 | Nabkel et al. | |
| 6,144,671 A | 11/2000 | Perinpanathan et al. | |
| 6,144,723 A | 11/2000 | Truchon et al. | |
| 6,151,387 A | 11/2000 | Katz | |
| 6,157,621 A | 12/2000 | Brown et al. | |
| 6,157,655 A | 12/2000 | Shtivelman | |
| 6,167,119 A | 12/2000 | Bartholomew et al. | |
| 6,173,041 B1 | 1/2001 | Borland et al. | |
| 6,178,230 B1 | 1/2001 | Borland | |
| 6,178,240 B1 | 1/2001 | Walker et al. | |
| 6,185,288 B1 | 2/2001 | Wong | |
| 6,195,419 B1 | 2/2001 | Gilboy | |
| 6,205,204 B1 | 3/2001 | Morganstein et al. | |
| 6,208,713 B1 | 3/2001 | Rahrer et al. | |
| 6,208,729 B1 | 3/2001 | Agraharam et al. | |
| 6,222,920 B1 | 4/2001 | Walker et al. | |
| 6,223,156 B1 | 4/2001 | Goldberg et al. | |
| 6,226,364 B1 | 5/2001 | O'Neil | |
| 6,233,234 B1 | 5/2001 | Curry et al. | |
| 6,246,759 B1 | 6/2001 | Greene et al. | |
| 6,246,988 B1 | 6/2001 | Schier | |
| 6,259,771 B1 | 7/2001 | Thomas et al. | |
| 6,263,051 B1 | 7/2001 | Saylor et al. | |
| 6,275,940 B1 | 8/2001 | Edwards | |
| 6,282,274 B1 | 8/2001 | Jain | |
| 6,282,275 B1 * | 8/2001 | Gurbani et al. | 379/142.06 |
| 6,285,749 B1 | 9/2001 | Manto | |
| 6,314,089 B1 * | 11/2001 | Szlam et al. | 370/270 |
| 6,317,484 B1 | 11/2001 | McAllister | |
| 6,324,269 B1 | 11/2001 | Malik | |
| 6,324,276 B1 | 11/2001 | Uppaluru et al. | |
| 6,327,343 B1 | 12/2001 | Epstein et al. | |
| 6,327,346 B1 | 12/2001 | Infosino | |
| 6,327,347 B1 | 12/2001 | Gutzmann | |
| 6,330,308 B1 | 12/2001 | Cheston et al. | |
| 6,330,315 B1 | 12/2001 | Kapsales | |
| 6,349,132 B1 | 2/2002 | Wesemann et al. | |
| 6,356,638 B1 | 3/2002 | Hardy et al. | |
| 6,363,145 B1 * | 3/2002 | Shaffer et al. | 379/265.02 |
| 6,381,317 B1 | 4/2002 | Bala | |
| 6,381,329 B1 | 4/2002 | Uppaluru et al. | |
| 6,393,112 B1 | 5/2002 | Gottlieb et al. | |
| 6,400,804 B1 | 6/2002 | Bilder | |
| 6,404,857 B1 | 6/2002 | Blair et al. | |
| 6,404,858 B1 | 6/2002 | Farris et al. | |
| 6,408,272 B1 | 6/2002 | White et al. | |
| 6,424,709 B1 | 7/2002 | Doyle et al. | |
| 6,430,174 B1 | 8/2002 | Jennings et al. | |
| 6,430,276 B1 | 8/2002 | Bouvier et al. | |
| 6,430,282 B1 | 8/2002 | Bannister et al. | |
| 6,442,242 B1 | 8/2002 | McAllister et al. | |
| 6,456,698 B1 | 9/2002 | Morganstein et al. | |
| 6,463,127 B1 | 10/2002 | Maier et al. | |
| 6,470,081 B1 | 10/2002 | Sbisa et al. | |
| 6,477,246 B1 | 11/2002 | Dolan et al. | |
| 6,480,599 B1 | 11/2002 | Ainslie et al. | |
| 6,487,291 B1 | 11/2002 | Walker et al. | |
| 6,502,745 B1 | 1/2003 | Stimson et al. | |
| 6,519,570 B1 | 2/2003 | Faber et al. | |
| 6,522,743 B1 | 2/2003 | Hurd | |
| 6,526,131 B1 | 2/2003 | Zimmerman et al. | |
| 6,529,585 B2 | 3/2003 | Ng et al. | |
| 6,535,492 B2 | 3/2003 | Shtivelman | |
| 6,535,582 B1 | 3/2003 | Harris | |
| 6,535,596 B1 | 3/2003 | Frey | |

| | | |
|---|---|---|
| 6,539,080 B1 | 3/2003 | Bruce et al. |
| 6,542,590 B1 | 4/2003 | Player |
| 6,546,238 B1 | 4/2003 | Nightingale |
| 6,556,127 B1 | 4/2003 | Moser et al. |
| 6,556,817 B1 | 4/2003 | Souissi |
| 6,603,843 B1 | 8/2003 | Hagemann |
| 6,606,596 B1 | 8/2003 | Zirngibl et al. |
| 6,614,885 B2 | 9/2003 | Polcyn |
| 6,631,181 B1 | 10/2003 | Bates et al. |
| 6,636,590 B1 | 10/2003 | Jacob et al. |
| 6,639,977 B1 | 10/2003 | Swope |
| 6,639,982 B1 | 10/2003 | Stuart et al. |
| 6,647,097 B1 | 11/2003 | Nashirozawa |
| 6,658,093 B1 | 12/2003 | Langseth et al. |
| 6,665,377 B1 | 12/2003 | McKinley et al. |
| 6,665,380 B1 | 12/2003 | Cree et al. |
| 6,678,359 B1 | 1/2004 | Gallick |
| 6,683,941 B2 | 1/2004 | Brown et al. |
| 6,697,456 B2 | 2/2004 | Chan et al. |
| 6,700,972 B1 | 3/2004 | McHugh et al. |
| 6,707,906 B1 | 3/2004 | Ben-Chanoch |
| 6,711,239 B1 | 3/2004 | Borland |
| 6,711,249 B2 | 3/2004 | Weissman et al. |
| 6,735,287 B2 | 5/2004 | Vishik et al. |
| 6,760,426 B2 | 7/2004 | Sbisa |
| 6,765,995 B1 | 7/2004 | Kobayashi |
| 6,768,792 B2 | 7/2004 | Brown et al. |
| 6,775,360 B2 | 8/2004 | Davidson et al. |
| 6,785,379 B1 | 8/2004 | Rogers et al. |
| 6,788,771 B2 | 9/2004 | Manto |
| 6,804,224 B1 | 10/2004 | Schuster et al. |
| 6,819,945 B1 | 11/2004 | Chow et al. |
| 6,826,173 B1 | 11/2004 | Kung et al. |
| 6,826,276 B2 | 11/2004 | Brown et al. |
| 6,842,512 B2 | 1/2005 | Pedersen |
| 6,842,767 B1 | 1/2005 | Partovi et al. |
| 6,845,155 B2 | 1/2005 | Elsey |
| RE38,715 E | 3/2005 | Rogers |
| 6,877,093 B1 | 4/2005 | Desai et al. |
| 6,885,734 B1 | 4/2005 | Eberle et al. |
| 6,901,255 B2 | 5/2005 | Shostak |
| 6,925,166 B1 | 8/2005 | Chan |
| 6,937,699 B1 | 8/2005 | Schuster et al. |
| RE38,801 E | 9/2005 | Rogers |
| 6,956,935 B2 | 10/2005 | Brown |
| 6,996,216 B2 | 2/2006 | Brown |
| 7,003,466 B2 | 2/2006 | Brown et al. |
| 7,027,576 B2 | 4/2006 | Schwab et al. |
| 7,042,988 B2 | 5/2006 | Juitt et al. |
| 7,076,051 B2 | 7/2006 | Brown et al. |
| 7,103,172 B2 | 9/2006 | Brown et al. |
| 7,130,405 B2 | 10/2006 | Brown et al. |
| 7,139,390 B2 | 11/2006 | Brown et al. |
| 7,155,608 B1 | 12/2006 | Malik et al. |
| 7,251,318 B1 | 7/2007 | Henderson |
| 7,305,550 B2 | 12/2007 | Oliver et al. |
| 7,394,893 B2 | 7/2008 | Brown et al. |
| 7,426,264 B1 | 9/2008 | Henderson |
| 7,486,779 B2 | 2/2009 | Brown et al. |
| 2001/0003092 A1 | 6/2001 | Sjodin |
| 2001/0047414 A1 | 11/2001 | Yoon et al. |
| 2002/0046030 A1 | 4/2002 | Havitsa et al. |
| 2002/0055906 A1 | 5/2002 | Katz |
| 2002/0058494 A1 | 5/2002 | Timonen et al. |
| 2002/0064261 A1 | 5/2002 | Afana |
| 2002/0082991 A1 | 6/2002 | Friedman |
| 2002/0091937 A1 | 7/2002 | Ortiz |
| 2002/0099670 A1 | 7/2002 | Jakobsson |
| 2002/0118807 A1 | 8/2002 | Pedersen |
| 2002/0123934 A1 | 9/2002 | Tanaka |
| 2002/0131399 A1 | 9/2002 | Philonenko |
| 2002/0136363 A1 | 9/2002 | Stumer et al. |
| 2002/0141561 A1 | 10/2002 | Duncan et al. |
| 2002/0147818 A1 | 10/2002 | Wengrovitz |
| 2002/0164000 A1 | 11/2002 | Cohen et al. |
| 2002/0181671 A1 | 12/2002 | Logan |
| 2002/0184096 A1 | 12/2002 | Kawahara et al. |
| 2002/0196927 A1 | 12/2002 | Johnson et al. |
| 2003/0031309 A1 | 2/2003 | Rupe et al. |
| 2003/0032414 A1 | 2/2003 | Melaku et al. |
| 2003/0043974 A1 | 3/2003 | Emerson |
| 2003/0053615 A1 | 3/2003 | Anderson et al. |
| 2003/0059007 A1 | 3/2003 | Beyda |
| 2003/0064709 A1 | 4/2003 | Gailey et al. |
| 2003/0081744 A1 | 5/2003 | Gurfein et al. |
| 2003/0095542 A1 | 5/2003 | Chang et al. |
| 2003/0103617 A1 | 6/2003 | Brown et al. |
| 2003/0103618 A1 | 6/2003 | Brown et al. |
| 2003/0103619 A1 | 6/2003 | Brown et al. |
| 2003/0108158 A1 | 6/2003 | Brown et al. |
| 2003/0108159 A1 | 6/2003 | Brown et al. |
| 2003/0108160 A1 | 6/2003 | Brown et al. |
| 2003/0108161 A1 | 6/2003 | Brown |
| 2003/0108162 A1 | 6/2003 | Brown et al. |
| 2003/0108163 A1 | 6/2003 | Brown |
| 2003/0108184 A1 | 6/2003 | Brown et al. |
| 2003/0108185 A1 | 6/2003 | Brown et al. |
| 2003/0108186 A1 | 6/2003 | Brown et al. |
| 2003/0108187 A1 | 6/2003 | Brown et al. |
| 2003/0112935 A1 | 6/2003 | Brown et al. |
| 2003/0112936 A1 | 6/2003 | Brown |
| 2003/0112941 A1 | 6/2003 | Brown et al. |
| 2003/0112942 A1 | 6/2003 | Brown |
| 2003/0112949 A1 | 6/2003 | Brown et al. |
| 2003/0112956 A1 | 6/2003 | Brown et al. |
| 2003/0114139 A1 | 6/2003 | Brown et al. |
| 2003/0114142 A1 | 6/2003 | Brown et al. |
| 2003/0115070 A1 | 6/2003 | Brown |
| 2003/0115138 A1 | 6/2003 | Brown |
| 2003/0156700 A1 | 8/2003 | Brown et al. |
| 2004/0029567 A1 | 2/2004 | Timmins et al. |
| 2004/0052337 A1 | 3/2004 | Brown et al. |
| 2004/0057569 A1 | 3/2004 | Busey et al. |
| 2004/0066916 A1 | 4/2004 | Brown et al. |
| 2005/0041649 A1 | 2/2005 | Wilson |
| 2005/0141679 A1 | 6/2005 | Zirngibl et al. |
| 2005/0238146 A1 | 10/2005 | Brown |
| 2005/0238151 A1 | 10/2005 | Brown |
| 2007/0058787 A1 | 3/2007 | Bajwa et al. |
| 2007/0286384 A1 | 12/2007 | Christensen et al. |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |

OTHER PUBLICATIONS

Office Action Dated Oct. 6, 2009 in U.S. Appl. No. 11/554,269.
WPAT Derwent 1994-067503.
WPAT Derwent 1995-346415.
WPAT Derwent 1996-315499.
WPAT Derwent 1999-031530.
Haimi-Cohen, et al.; User Confirmation for Speech Recognition System; WPAT—Derwent; 1995-346415; American Telephone & Telegraph Co.
Hou, et al.; Communication Method for Telephone Service Using Speech Recognition; WPAT—Derwent; 1994-067503; American Telephone & Telegraph Co.
Information Terminal Equipment; WPAT—Derwent; 1999-031530; Hitachi Ltd.
Voice Controlled Telephone Dialling Apparatus; WPAT—Derwent; 1996-315499; Sharp KK.
Information Termianl Equipment; WPAT—Derwnet; 1999-031530; Hitachi Ltd.
Office Action, U.S. Appl. No. 12/030,746, USPTO Mail Date Sep. 28, 2010.
Office Action, U.S. Appl. No. 12/237,067, USPTO Mail Date Aug. 30, 2010.
"VOip Gateways: Bigger and Better", Business Communications Review, vol. 31, No. 9, vol. 56(7) (9/01).

* cited by examiner

| CALL CONTEXT RECEIPT 180 |
|---|
| REQUESTED FOR : BUSINESS C<br>PARAMETERS : BUSINESS CALLS LOGGED TO JANE MARKS IN JANUARY 2002<br><br>1/3/2002 10:30:20 TO 10:50:10 - CENTRAL<br>CALLER : JANE MARKS<br>ON BEHALF OF : BUSINESS C<br>CALLEE : ENTERPRISES CORP<br>CALLER DEVICE : BUSINESS WIRELESS DEVICE<br>BILLING : TO BUSINESS C SERVICE PROVIDER<br>SUBJECT : BUSINESS - PROJECT A<br><br>1/5/2002 11:20:10 TO 12:30:15 - CENTRAL<br>CALLER : TISH JOHNSON<br>ON BEHALF OF CALLER : JANE MARKS<br>CALLEE : SUPPLIER D<br>CALLER DEVICE : WIRELINE<br>ORDER : ORDER #2011010 : 10 UNITS PRODUCT C<br>ORDER BILLING : TO BUSINESS C, PROJECT A ACCOUNT PROVIDER<br>SUBJECT : BUSINESS - PROJECT A<br><br>1/6/2002 2:20:01 TO 2:50:50 - CENTRAL<br>CALLER : ALBERT JONES<br>CALLEE : JANE MARKS<br>CALLEE DEVICE : PERSONAL WIRELESS DEVICE<br>BILLING : TO ALBERT JONES' ACCOUNT PROVIDER<br>SUBJECT : BUSINESS - PROPOSAL C |

FIGURE 10

LOGGING CALLS ACCORDING TO CALL CONTEXT

CROSS-REFERENCE TO RELATED APPLICATION

This application is a continuation application of and claims priority from U.S. patent application Ser. No. 10/022,624, filed on Dec. 17, 2001.

BACKGROUND OF THE INVENTION

1. Technical Field

The present invention relates in general to telecommunications and, in particular, to voice identification. Still more particularly, the present invention relates to logging calls according to the context of the calls.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Today, the public switching telephone network (PSTN), wireless networks, and private networks telephone services are based on the identification of the wireless telephone or wireline that a calling party uses. A service, often referred to as Acaller ID@, provides the party receiving a call with the line number and name of the subscriber of the line number from which a call originates.

One limitation of caller ID is that the identity of the party actually making the call is not received, just the name of the line subscriber. For example, in a private network, if AJoe Smith@ is making a call from ATom Arnold's office line@ only the extension for ATom Arnold's office line@ and an identifier for ATom Arnold@ are transferred to the called party.

Another limitation of caller ID is that the identity of the party answering the call is not returned to the party making the call. For example, in a PSTN, a single line number may be answered by multiple parties, and at multiple telephone devices, where the caller ID does not identity the party answering the call.

A further limitation of caller ID is that a line number and line subscriber name provide a limited context for a call. For example, in a wireless network, where ATom Jenkins@ calls a friend's wireless number, ATom Jenkins@ does not receive any information about whether the call is wireless, how the call is being billed, and whether the wireless number is a business or personal number.

Therefore, in view of the foregoing, it would be advantageous to provide a method, system, and program for providing the context of a call, including the actual identities of parties making and receiving calls, the devices at which calls are originated and received, and the owners of the devices at which calls are originated and received. In addition, it would be advantageous to provide additional context information indicating the location of a device originating or receiving a call, where location information may include the time zone, state, country or other locale related specifics.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for logging calls according to the context of the calls.

According to one aspect of the present invention, a context for a call is detected, where the context include information such as the parties to a call, whether a backup party is accessed, where the call is on behalf of another, the locations of the parties to the call, the subject matter of the call, tariffs applied during the call, billing for telephone services accessed during the call, and orders placed during the call. At least one context based logging request valid for the context for the call is accessed from among multiple context based logging requests stored for multiple parties. Parties requesting logging may include parties to the call, on behalf of parties, third parties, and guardians. The context is logged according to the context based logging request.

In particular, a trusted telephone network preferably processes the call and initiates a context inference service to identify the context of a call. The context inference service may be initiated locally within the trusted telephone network or at a server located outside the trusted telephone network, with additional security applied for the communication channel. Then, a context logging service may be initiated to controlling logging of the context of the call. The context logging service may also be initiated locally within the trusted telephone network or at a server located outside the trusted telephone network, with additional security applied for the communication channel.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 10 illustrates an illustrative embodiment of a call context receipt in accordance with the method, system, and program of the present invention.

DETAILED DESCRIPTION OF THE PREFERRED EMBODIMENT

Figure 1:
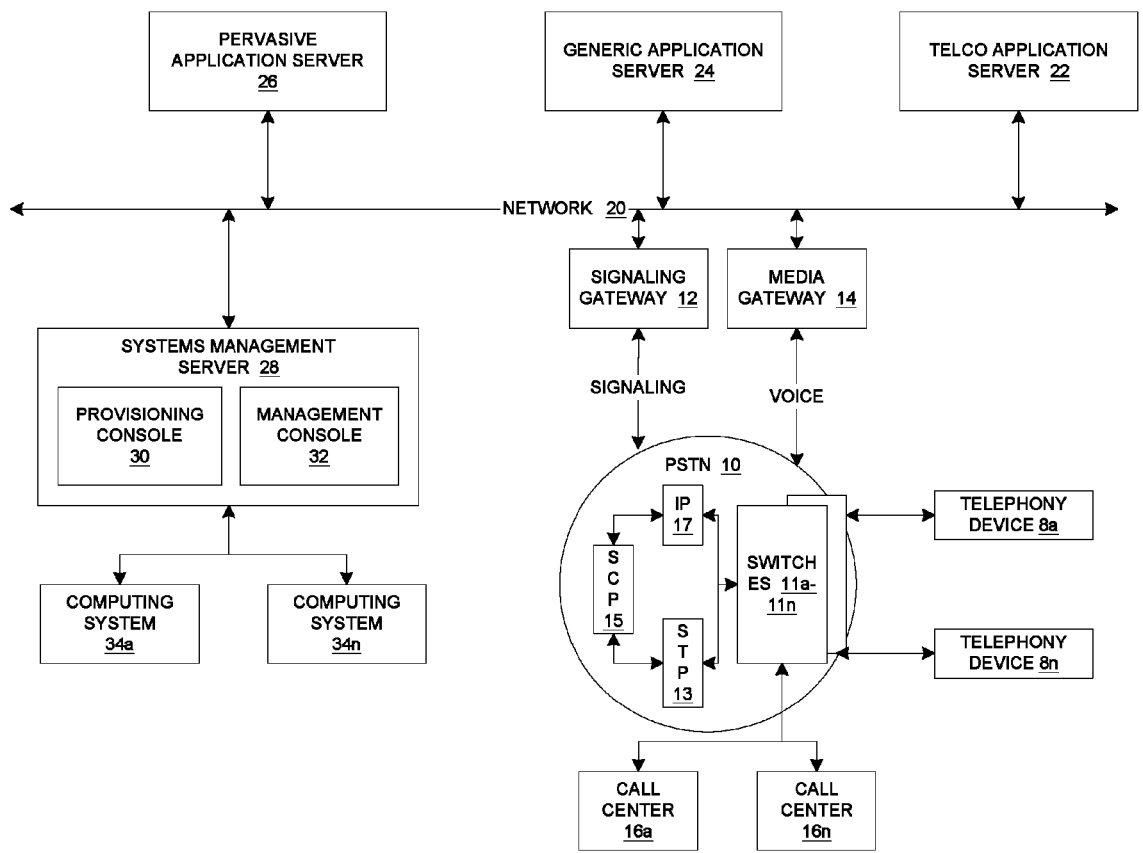
FIG. 1 depicts a block diagram of a network environment in which the present invention may be implemented.

A method, system, and program for logging calls according to call context are provided. For purposes of the present invention, context may include, but is not limited to, the identity of the caller or callee, the device identity and owner, the location of the caller and callee, the path of a call, and billing information for the caller and callee. Location of the caller and callee may include, but is not limited to, the time zone, country, state, city, building location, or GPS location of a caller or callee.

Call context is preferably performed by a context inference engine located within an Intelligent Peripheral of the trusted telephone network and/or located within a Telco Application server outside the trusted telephone network. As will be further described, the Telco application service located outside the trusted telephone network is enabled to provide services to callers and callees via enhanced security channels.

A logging service preferably controls logging calls according to call context. The logging service may be located within an Intelligent Peripheral of the trusted telephone network and/or located within a Telco Application server outside the trusted telephone network.

The identity of the caller and callee are preferably authenticated. In particular, identity authentication is preferably performed by authenticating the voices of the caller and callee, however other biometric input may also be utilized for identification. Identity authentication may be initiated by the origin device originating the call, the intermediary device processing the call, or the destination device receiving the call. Each of the devices may access a third party or external server to perform the identity authentication. Performance of identity authentication has different advantages depending on the device initiating the identity authentication, as is also described in the incorporated references.

Other context information is received, determined and inferred from context clues. Context clues may include the identities of the caller and callee, the line numbers, the line number subscriber profiles, caller/callee profiles, and other parameters associated with the call. As a call is transferred and forwarded, context clues for each portion of a call path are gathered and utilized to update the context of the call, including whether a backup party is automatically accessed for a callee unavailable to answer the call. If a call is placed or received on behalf of another, the context is updated to reflect the on behalf of party. In addition, as tariffs are received or paid during a call, the context clues are updated to include tariff transactions. Moreover, if orders are placed for products or services during a call, the context clues are updated to include order transactions.

An individual who is a party to a call, an individual who is an on behalf of party to a call or a backup party to a call, a third party (e.g. business entity), a government, or a guardian may set preferences for logging call context and recording calls according to call context. By logging calls according to call context, more than just line numbers and the identities of subscribers to those line numbers are recorded for a call. In addition, logged call context provides a record of receipt of a call and a verification of the transactions that occur during a call. Selecting calls to record according to call context allows automated recording of calls according to subject matter, parties involved in the call, locations of the parties, billed transactions during the call, orders placed during the call, and other criteria included in call context.

According to another advantage of the present invention, the voice, data, video and other transactions occurring during a call may be recorded. In particular, where a voice communications are recorded during a call, the voice communications may be transcribed from speech into text, such that the text is embedded into a logging receipt for the call.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a-8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a-34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Looking into PSTN 10, a telephone network typically includes multiple switches, such as central office switches 11a-11n, that originate, terminate, or tandem calls. Central office switches 11a-11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a-11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a-11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11a-11n and telco application server 22 via signaling gateway 12. In addition, a voice channel is opened between central office switches 11a-11n and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11a-11n, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a-11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a-11n if the additional caller input is verifiable for the VID.

An origin telephony device or destination telephony device may also determine a VID and/or RVID for the caller and/or callee of a call. In particular, telephony devices 8a-8n and call centers 16a-16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a-8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a-8n.

In addition, telephony devices 8a-8n may each incorporate a display that provides a visual output of a VID or RVID. Alternatively, such a display may be provided in a separate device connected to the line in parallel to telephones 8a-8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a-8n are communicatively connected to PSTN 10 via wireline, wireless, ISDN, and other communication links. Preferably, connections to telephony devices 8a-8n provide digital transport for two-way voice grade type telephone communications and a channel transporting signaling data messages in both directions between telephony devices 8a-8n and PSTN 10.

In addition to telephony devices 8a-8n, advanced telephone systems, such as call centers 16a-16n, may be communicatively connected to PSTN 10 via wireline, wireless, ISDN and other communication links. Call centers 16a-16n may include PBX systems, hold queue systems, private network systems, and other systems that are implemented to handle distribution of calls to multiple representatives or agents.

Returning to central office switches 11a-11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a-11n. The assigned telephone number includes the area code (NPA) and exchange code (NXX) for the serving central office and four unique digits (XXXX).

Central office switches 11a-11n utilize office equipment (OE) numbers to identify specific equipment, such as physical links or circuit connections. For example, a subscriber's line might terminate on a pair of terminals on the main distribution frame of one of central office switches 11a-11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, authentication of the identity of the caller is preferably initiated in IP 17 or telco application server 22. Once a VID for a caller is received at a central office switch, a context inference application is initiated in IP 17 or telco application server 22. The context inference engine preferably requests a caller profile according to VID to determine billing and personal information about the caller. In addition, the context inference engine preferably determines the identity of the device utilized by accessing a device directory, prompting the caller to indicate the device identity, or other methods. Further, the location of the device may be inferred from information provided by the central office switch originating the call, a GPS location, and the location assigned to a line number. The context information is preferably loaded with the VID at the central office switch.

The context information may be filtered at the central office switch according to general filtering preferences indicated by a caller in the caller profile. In addition, context information may be filtered according to caller filtering preferences specifically selected for the callee. Context information is then transferred with the call routed by one or more central office switches to a destination central office switch that services the called party's station or line.

Then, in the present invention, the context information is forwarded with a caller VID to the callee device. The callee is enabled to determine whether to answer a call, transfer the call to voice mail, or select from other call handling options, based on knowing the identity of the caller and the context of the call.

In addition, authentication of the identity of a callee answering the call is preferably initiated in IP 17 or telco application server 22. Once a RVID for a callee is received at a central office switch, a context inference application is initiated in IP 17 or telco application server 22 to determine the context of the callee side of a call. The callee context information is preferably filtered according to callee preferences and transferred to the caller, such that the caller is enabled to determine whether the callee is the intended recipient.

As a call is forwarded or transferred to other callers and callees, IP 17 or telco application server 22 are preferably initiated to update the context for a call. For example, the context may indicate the path of line number accessed in a call and whether the call was transferred or forwarded.

According to an advantage of the present invention, context determined for calls may be forwarded to a logging service executing within IP 17 or telco application server 22. The logging service preferably controls logging of call context and recording of calls according to call context. In particular, parties to the call may request logging of call context. In addition, an individual who is an on behalf of party to a call or a backup party to a call, a third party (e.g. business entity), a government, or a guardian may set preferences for logging call context and recording calls according to call context. For example, a business entity may request that the context of business related calls placed or received by employees be recorded, regardless of the device utilized to place or receive the calls. In another example, where a call is received on behalf of another party, that on behalf of party may request to log the call context. In yet another example, where a call is transferred to a context based backup for an intended callee, the backup party may requesting to log the call context. Moreover, a legal guardian may request to log the call context of calls made or received by a minor.

The logging service preferably logs call context and calls into a database management system or SCP. Logging call context facilitates production of receipts and billing with details such as the parties to the call, the time, and other context which provide objective evidence as to the nature of business calls when proof of the nature of the call is required.

Figure 2:
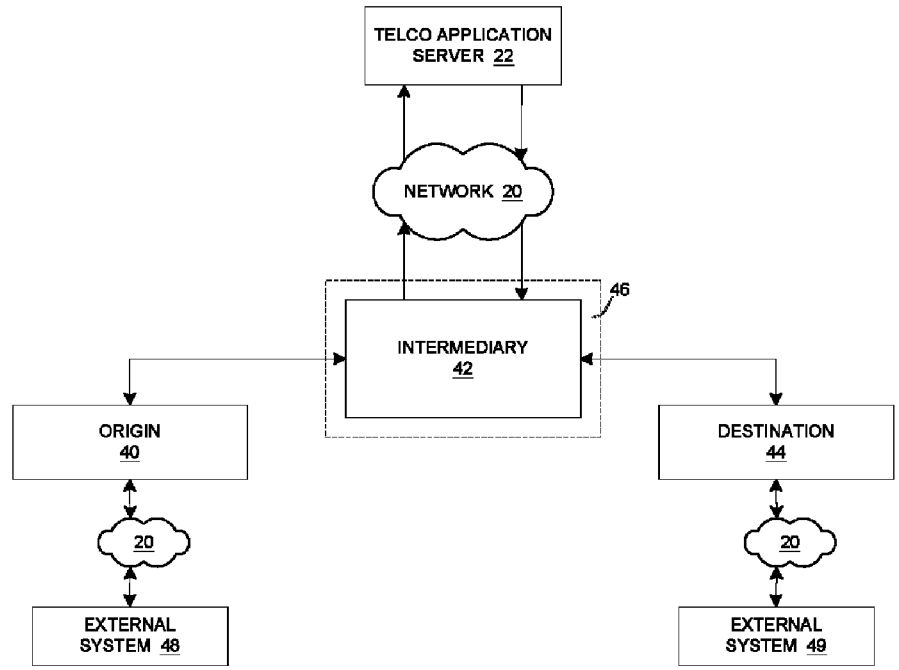
FIG. 2 illustrates a block diagram of an identity authentication and context inference system in accordance with the method, system, and program of the present invention.

Referring now to FIG. 2, there is illustrated a block diagram of an identity authentication and context inference system in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, to authenticate the identity of the caller. If there is a match between the voice utterance and a voice template, then a VID is determined for the caller and utilized to authenticate the caller identity for retrieving a caller profile and billing the caller. However, in alternate embodiments, the identity of a caller may be authenticated according to passwords, eye scans, encryption, and other biometric methods.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Similarly, a destination device 44 is utilized by a callee to receive a call. Advantageously, an authenticated identity of the callee may be determined as an RVID. Callee identity authentication may be initiated by origin device 40, intermediary device 42, or destination device 44, in a manner similar to initiation of caller identity authentication, as described above.

In addition to authenticating the identity of a caller or callee in a VID or RVID, the context of the call is preferably determined and transmitted as part of the VID or RVID or separate therefrom. Origin device 40, intermediary device 42, telco application server 22, and/or destination device 44 may include context inference engines that perform context inference services. A context inference engine may utilize context information gathered from multiple databases and may gathered context information directly from a caller or callee in response to prompts.

Context may include, but is not limited to, identities of the parties to a call, a subject matter of a call, a device identity, the location of an origin or destination device, billing information, service subscriptions, the path of a call, and other information which may provide a caller or callee with context of a call. Information for determining the context of a call may be gathered from a caller or callee profile, from routing information utilized by intermediary 42 from a device directory, from systems management server 28, or other databases of information. The context inference engine may, for example, infer the subject matter of a call as either business or personal based on the identity of the device from which a call originates and the location of that device. Alternatively, the subject of a call as either a business subject or personal subject may be inferred from the billing information context.

A VID or RVID may be transferred in multiple protocols, including, but not limited to, Interface Definition Language (IDL). A VID or RVID may include a range of information, where each type of information may be tagged or identified in some other manner. For example, the following tagged VID may be transmitted to represent an authenticated identity of a caller and context of the call:

[timed start] 06:20:02
[date] Dec. 22, 2003
[caller name] Jon Smith
[caller device name] Jane Doe's cell phone
[caller location] Central Time zone, Austin, Tex.
[subject] Project A
[billing] Jon Smith's business service provider C
[authenticated by] Jane Doe's cell phone, service provider G In another example, the following tagged RVID may be transmitted represent an authenticated identity of a callee answering the call as a backup for another party and the context of the call, including the path of the call:

[backup callee name] Albert Jones
[backup callee device] Albert Jones' home phone
[intended callee] Herbert Smith
[backup callee location] Dallas, Tex.
[path] call forwarded from 101-304-0000 to 214-333-1111

Figure 3:
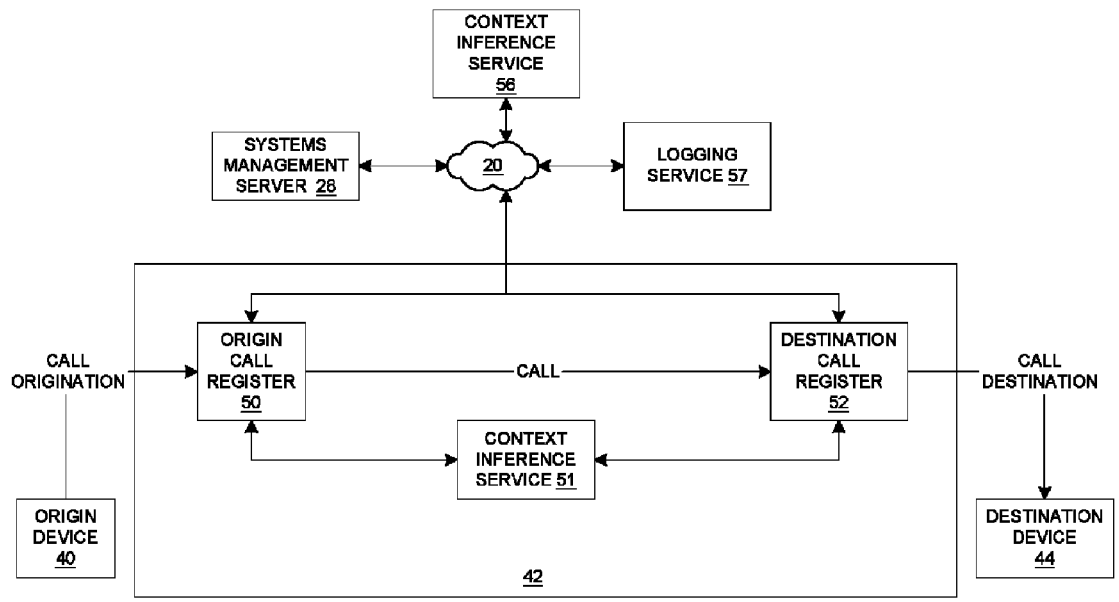
FIG. 3 depicts a block diagram of the flow of a call through a context inference system and logging system in accordance with the method, system, and program of the present invention.

With reference now to FIG. 3, there is depicted a block diagram of the flow of a call through a context inference system and logging system in accordance with the method, system, and program of the present invention. As illustrated, origin device 40 transfers a call request to intermediary device 42. The call request may be an off-hook condition for a wireline device or a network service connection request for a wireless device.

Preferably, a switching service receiving the call request establishes an origin call register 50 and retrieves a line subscriber profile for the origin device line number. The line subscriber profile may be accessed from an SCP or a data storage system external to trusted telephone network 46.

Next, a context inference service may be initiated by the origin switching service. In particular, a context inference service 51 may be located within trusted telephone network 46 as an IP. Alternatively, a context inference service 51 may be located outside trusted telephone network 46 within a telco application server accessible via network 20.

The context inference service preferably determines context for a call including, but not limited to, who is calling, the device utilized to place the call, the location of the caller, the billing method for the call, tariffs charged during the call, the path of the call, and/or the subject matter of the call. In addition, the context inference service preferably determines context for a call including, but not limited to, who receives a call, the device utilized to receive the call, the location of the callee, and the subject matter available for discussion by the callee. In addition, other categories of context may be determined.

To determine the context of the device utilized to place a call, the entity subscribing to the line number and/or an identifier for the device are preferably accessed. The first set of context clues is provided to the context inference service by the line subscriber profile. In particular, a line subscriber profile indicates the individual or business that subscribes to a particular line number. Further, a line subscriber profile may indicate that a business subscribes to a telephone service, but provide that service is subscribed to for use by a particular employee or group of employees.

In addition, the line subscriber profile indicates the billing information and services subscribed to by the line subscriber. Billing information may provide context for whether the line number is a business line or personal line. In addition, a billing context for a call may indicate the party responsible for charges incurred in the call.

Preferably the identity of the device may be inferred from the line subscriber profile and other information available. A device identity may include a device name, a line number utilized to access the device, and the device type. The device name may be assigned by the line subscriber and output with a signal from the device. Alternatively, the line subscriber profile may indicate the device name. The device type may indicate the type of line utilized to access the device, including, but not limited to, wireline, wireless, or multiplexed. In addition, the device type may indicate the type of device accessed by the line including, but not limited to, a car telephone line, a computer modem line, a PBX land line, a residential line, a business line, or an Asymmetric Digital Subscriber Line (ADSL) multiplexed line. Additional context may be inferred from the device identity.

Further, determining or inferring the location of a device is advantageous context information. For a wireless device, the location of a device may be determined most precisely where a GPS tracking system is utilized by the origin device 40 or intermediary device 42, to determine the exact geographical location of a caller. For a wireline device, the location of the device is fixed according to the location the service is installed for the number.

In addition, for both a wireline and wireless device, a general location of the originated call may be determined from the geographical area covered by the switching center receiving the call. Wireless devices are preferably provided service by a particular tower or other signal distribution point. The geographical location and area covered by that tower may provide a general location of the origin of a call. As the origin device moves from one wireless coverage area to another, the location may be updated.

The context inference service may infer additional context from location information. For example, the time zone of the caller, the direction of movement of the caller, and other location related information may be inferred from location information.

In addition to extending a dial tone to a caller, an identity of the caller is preferably authenticated and loaded into origin call register 50. A caller profile accessed according to the VID is then accessed and loaded into origin call register 50. The context inference service preferably utilizes the caller profile and VID as additional context clues for the call.

In particular, in retrieving a caller profile according to VID, systems management server 28 may be accessed. Systems management server 28 preferably provides an interface through which an individual may adjust preferences, select services, and provide other information, which is stored and made accessible according to the individual's VID. Systems management server 28 may track services that an individual subscribes to, such as a stock subscription service. In addition, systems management server 28 allows an individual to adjust billing information and view current charges according to VID.

The VID provides the context of who is placing the call. The caller profile provides further context based on the billing information and service subscriptions of the caller.

In addition, a caller profile may include preferences for filtering context information depending on multiple factors. Such factors may include, but are not limited to, the callee, the device placing the call, the device receiving the call, the time of day, a caller's schedule, and other variables selected by the caller.

The subject matter of a call may be determined by prompting a caller to provide a voice or text entry indicating the subject matter of the call. Alternatively, the context inference engine may infer the subject matter of a call based on the caller's schedule. The context inference engine may also infer the subject matter of a call based on the caller's business or the business associated with the line number utilized by the caller.

The call is preferably transferred through a voice channel to a destination switch, in which a destination call register 52 is created to hold the call. In addition, context for the call may be transferred through a signaling channel to the destination switch and loaded into destination call register 52.

Advantageously, the destination switch controls termination of the call at destination device 44. The context information for the call is also transferred to destination device 44, such that the callee is provided with a context for the call. The context information available in destination call register 52 may be filtered prior to transmittal to destination device 44 according to filtering preferences associated with the device, a line subscriber, or the callee. In addition, destination device 44 may filter the context displayed to a callee according to the device capabilities and preferences selected for the device.

In particular, the destination switch preference initiates at least one of context inference service 51 and context inference service 56 to determine the context of the recipient side of a call. Determining the context of the recipient side of a call may be performed in a manner similar to that described with reference to determining the context of the caller side of a call. In addition, as will be further described, context inferences may be further enhanced when caller side and recipient side context information is combined.

In particular, the line subscriber profile associated with destination device 44 may be accessed and utilized by the context inference service to determine context for the call. In addition, destination device 44 may return a device identifier to destination call register 52 or the identity of destination device 44 may be inferred from other context information. Further, the identity of the callee is preferably authenticated, such that the RVID and callee profile accessible according to RVID further enhance context information.

Context information determined for the recipient side of the call may be transferred to origin device 40 via origin call register 50. Filtering of the recipient said call context may be performed according to multiple factors, including callee filtering preferences. In particular, multiple entities may receive the filtered context information, where filtering preferences may be uniquely specified for each of the multiple entities.

Additional context inferences may be made when caller side and recipient side context information is viewed concurrently. For example, where the caller is a subscriber to a stock service and the callee is the stock service, the subject matter of the call may be inferred to include access to the stock service.

In addition, context may indicate the path of a call. Each line number accessed during a call is preferably captured by a switch, such as the origin switch or destination switch. In addition, where origin device 40 or destination device 44 are call centers or private switching networks, the path of the call through the call centers or private switching networks may be captured.

According to an advantage of the present invention, the context of a call is preferably transferred to a logging service, such as logging service 57 executing within a telco application server. Logging service 57 may also execute within an IP of trusted telephone network 46. Call context transferred to logging service 57 may be filtered according to logging preferences for a caller or callee.

Preferably, logging service 57 maintains a directory of logging requests stored according to VIDs, RVIDs, business entities, government entities, times, dates, and context. Incoming call context may be utilized by logging service 57 to search the directory of logging requests and determine whether any logging requests exist for the call. In addition, a caller or callee profile accessed by the context inference service may include logging request preferences, such that logging requests may be attached to the context of the call.

Logging requests may in general request logging of the context of calls, however more advantageously, logging requests may request logging of the context of calls according to the context of those calls. In addition, recording requests may be general requests, or may request recording of calls according to the context of those calls.

Figure 4:
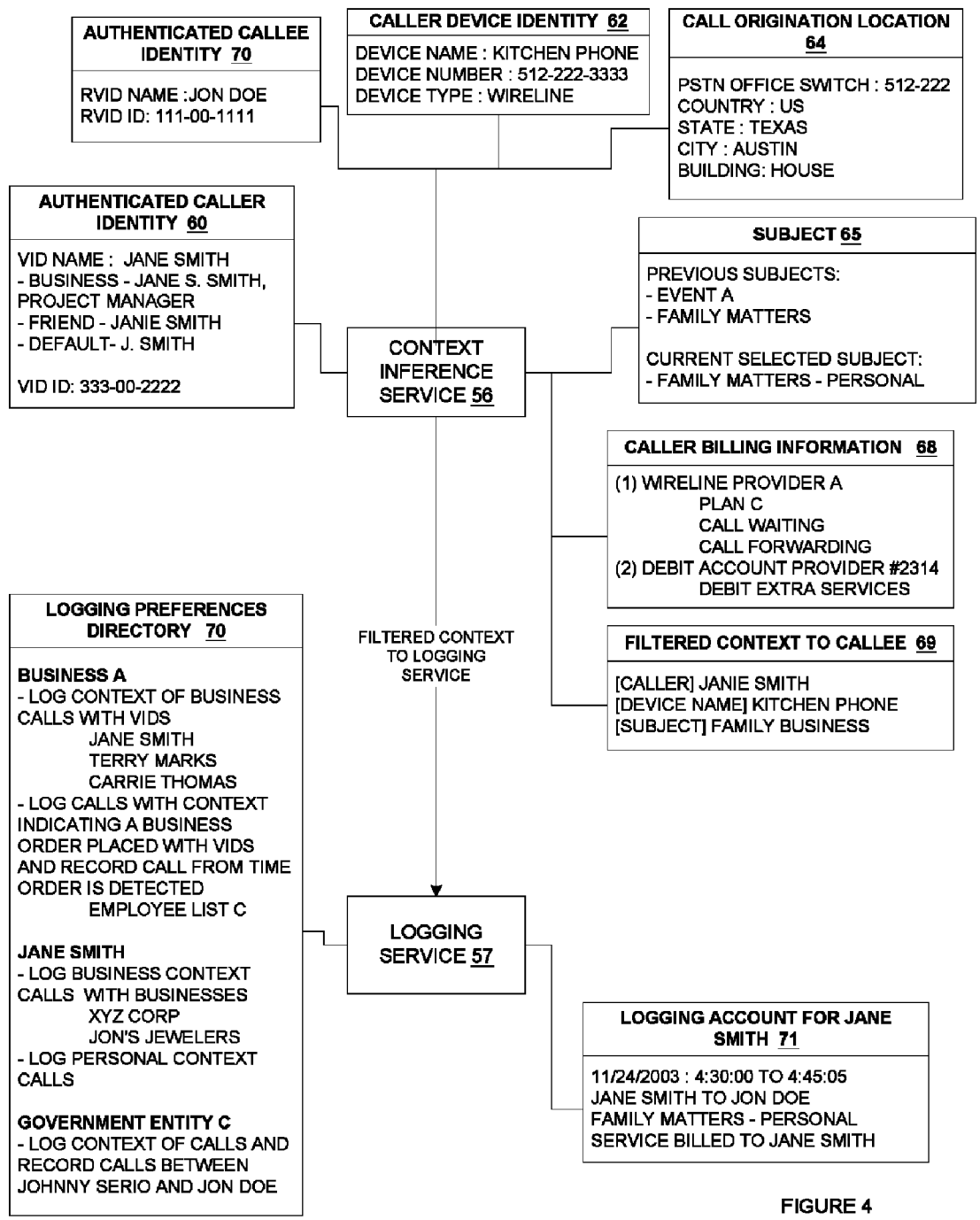
FIG. 4 illustrates an illustrative example of context information logging in accordance with the method, system, and program of the present invention.

Referring now to FIG. 4, there is depicted an illustrative example of context information logging in accordance with the method, system, and program of the present invention. As illustrated, multiple types of context information may be accessed and determined by context inference service 56. In addition to the examples depicted, in alternate embodiments, other types of context information may be accessed and determined.

In the example, a call is placed by AJane Smith@ to AJon Doe@. For purposes of illustration, context inference service 56 is determining the context for a call from the perspective of the caller, with reference to the identity of the callee. However, call context may also be determined from the caller and callee perspectives concurrently or independently.

First, authenticated caller identity context 60 is retrieved to indicate who is calling. Advantageously, the name and identifier of a caller may be determined by authenticating the voice of the caller or utilizing other caller identification. An authenticated identity may also indicate, for example, the device utilized to perform the authentication, the frequency of identity of authentication, and the number to tries to achieve identity authentication.

According to one advantage of the present invention, a caller may provide multiple variations of a name categorized according to the type of callee receiving the VID. For example, a business associate may receive the caller's full name and job title. A friend may receive the caller's nickname. As will be further described, the VID name is preferably filtered for output to a callee according to caller preferences and the callee identity.

Next, caller device identity context 62 is determined to indicate the device utilized to place the call. An origin device may provide device identification or the context inference service may detect and/or infer the device identity. In the example, device identity context includes the name of the device, the line number associated with the device and the type of device. The name of a device may include a specific phone within a business or home or may indicate the subscriber of the line number. In addition, the name of the device may include a server system or private switching network identifier enabling the origin device. The device type may indicate whether a wireless or wireline connection is utilized by the device.

A call origination location context 64 is also determined to indicate the geographical location of the origination of a call and provide information for determining a device identity. A GPS location of an origin device may be transmitted with the call or detected by an intermediary device. In addition, the context inference service may determine a general location of an origin device based on the geographical area serviced by a PSTN switching network or wireless service provider service area. In the example, the PSTN switching network office switch receiving the call is identified by the numbers serviced by that office switch. The context inference service may then lookup the office switch geographical area, which in the present example includes country, state, and city identifiers. Further, in the example, the context inference server may lookup the line number to determine the type of building assigned to the line number, here Aresidential@.

Further, caller service subscriptions context 66 is depicted to indicate the services selected by a caller. A caller may subscribe to services accessible via telephone that are accessible according to the caller VID. In the example, caller service subscriptions include a stock subscription, a banking subscription, and travel subscriptions. Such subscriptions may charge the caller per access or may authorize the service to call the caller when criteria indicated by the caller occur. Indicating caller service subscriptions enhances context when a caller makes a call to a service already subscribed to or to a service not yet subscribed to.

In addition, caller billing information context 68 is provided to indicate the billing selections of a caller. Each caller may select multiple service providers and billing options that are accessible according to the caller VID. In the example, a caller has selected a wireline provider A and a debit account provider. Wireline provider A preferably services the current call. Extra services requested by the caller are preferably charged to the caller's debit account. The context inference engine may filter billing information to indicate a portion of a call the caller will pay for, service available for the call, and whether the caller will pay for additional services.

A subject context 65 indicates previous subjects of calls by the caller from the device. The caller may be prompted to select from one of these previous subjects, stored according to VID in the caller profile. In this example, the caller has selected the subject of the call as personal and more specifically as Afamily matters@. A caller may further select a level of urgency of the call, specify the type of family business, or other further specifications of the subject matter of a call. In addition to storing previous subjects according to caller and device, previous subjects may be stored according to the caller/callee combination, and retrieved when the caller/callee combination is detected. Moreover, a caller may be enabled to search through the database of previous subjects, organized according to caller, device, callee, time, location, and other criteria. A caller may also have a list of Afavorite subject matter@ from which quick subject matter selections may be made.

The context is preferably filtered according to caller filtering preferences which indicate the portions of context that a callee or a data mining service is allowed to received. As an example, filtered call context to the callee 69 includes the tagged VID for transfer to the callee, including filtered context information. In alternate embodiments, other types of context information may be filtered to the callee.

According to an advantage of the present invention, filtered context information is also transferred to logging service 57. The context filtered for the logging service may be different than the context filtered to send to the callee. In particular, the context may be time stamped according to the start time of the call and date. Alternatively, logging service 57 may access time stamp information from the service provider for the call.

In the example, a logging preferences directory 70 includes logging preferences specified by business entities, individuals, and governments, however other parties not depicted may also specify logging preferences. Preferably, each entity may select preferences for logging call context and recording a call according to the call context. In the example, the preferences retrieved are those related to the context of the call. For example, business A has a preference to log calls with a business subject context where the VID includes Jane Smith. Also, business A has a preference to log calls with a context indicating an order placed with VIDs from employee list C, where Jane Smith is included in employee list C. Since the context of the call is not a business call, the context will not be logged for business A. However, preferences for Jane Smith request logging calls with a personal context. Here, there is a personal subject context, so the call is preferably logged for Jane Smith's logging account. A government entity has already requested logging the context of calls between Jon Doe and Johnny Serio. Since Johnny Serio is not a party to the call, the call context will not be logged. In particular, a government entity may receive a warrant to tap a phone for calls between certain individuals. Here, preferably a context based warrant would entitle logging and recording calls according to context of the call.

Preferably a logging account 71 for Jane Smith logs the call context for the current call. In particular, the date, time, parties, subject and billing for the call are recorded. While not depicted, the logging preferences for Jane Smith may indicate the types of context information that are requested for logging, in addition to the context criteria utilized to select which calls to log. In addition, a caller or callee may include preferences for portions of the context of a call to be blocked from logging. For example, a caller may request that the caller's location be blocked from logging by a business entity logging the call. In addition, business entities logging calls may need to receive authorization from to do so.

Where a call is recorded according to context, in addition to logging the call context, the parties to the call may or may not be notified of the recording. In particular, where a government entity has obtained authorization to record a call, parties may not be notified that the call is automatically being recorded according to context. However, where a business or individual requests to record a call according to context, an announcement or other indication that the call is being recorded is preferably output. Where the call is recorded, a sound file may be attached to the context record.

Figure 5:
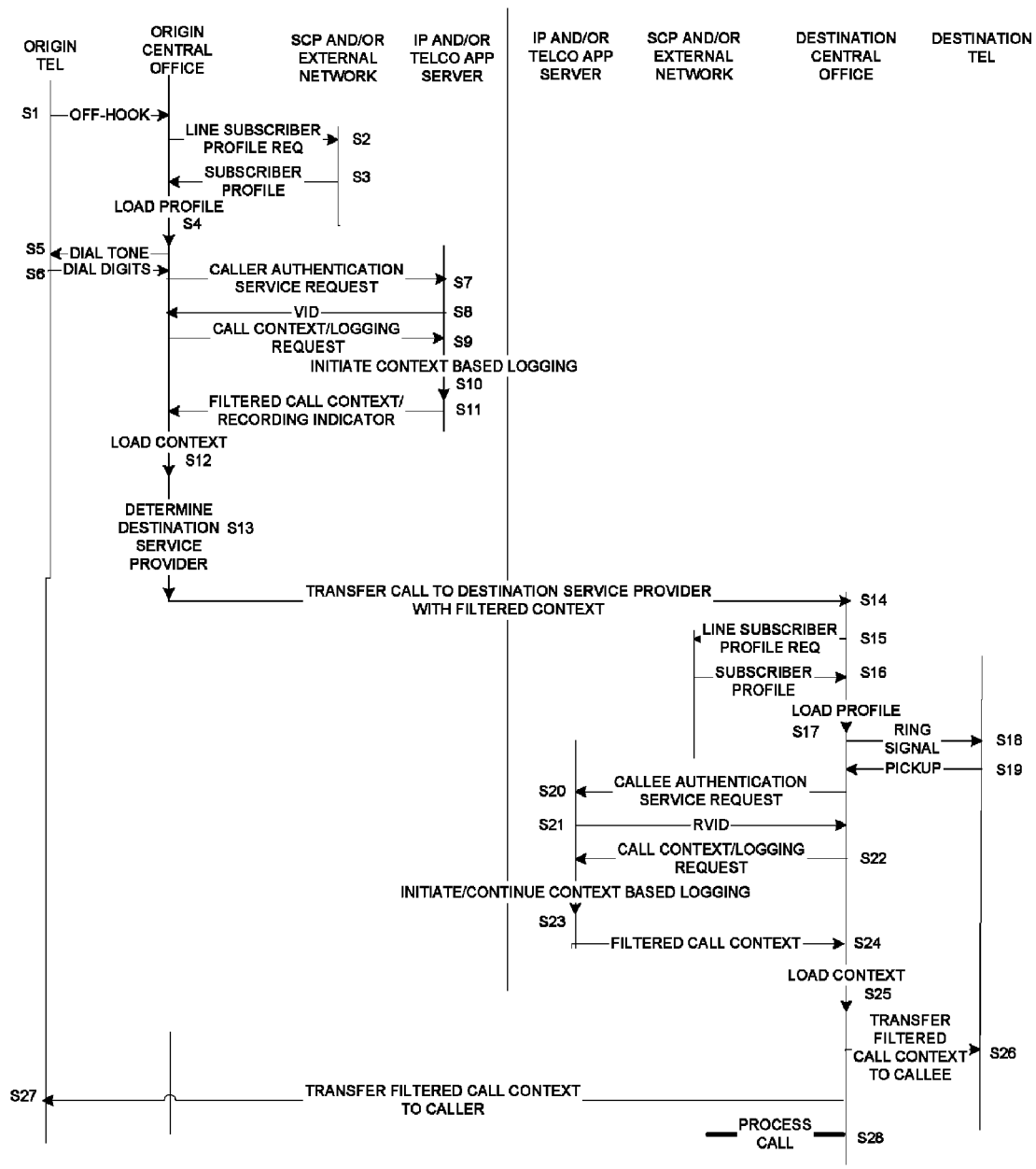
FIG. 5 depicts a flow diagram of a signal flow and processing of a call in accordance with the method, system, and program of the present invention.

With reference now to FIG. 5, there is depicted a flow diagram of a signal flow and processing of a call in accordance with the method, system, and program of the present invention. A standard telephone device is assumed for the Atel@ origin device and destination device in the present example. However, a similar signal flow may be applied to other types of origin and destination devices, including server systems, private switching networks, and call centers. Further, the flow is described with reference to wireline devices, however is not limited in application to wireline devices.

The caller lifts a handset creating an off-hook state in the origin device and a corresponding change in state of an off-hook signal to the central office (step S1). In response to detecting an off-hook state in the origin device, the central office establishes a register for the call and requests a line subscriber profile from the SCP and/or an external network server (step S2). A line subscriber profile including preferred services and a billing plan is returned to the central office (step S3). The central office loads the line subscriber profile into the call register (step S4) and extends a dial tone to the origin device (step S5).

The origin device then transmits dialed digits to the central office (step S6). A caller may utilize a keypad to enter a telephone number or utilize a voice dial feature if available. Dialed digits may be received at other points in the process and loaded into the call register until needed for processing the call.

Next, the central office extends a caller authentication service request to an IP or to the telco application server (step S7). The caller authentication server will prompt a caller to provide a voice utterance, match the voice utterance with a voice template and authenticate the caller identity as a VID which is returned to the central office (step S8). Alternatively, the origin device or destination device may perform caller authentication, where the VID is received from the origin device or destination device.

Thereafter, the central office extends a call context request request to a context inference service available from an IP or telco application server (step S9) and requests transfer of the call context to a call logging service within an IP or telco application server. The context inference service preferably accesses and loads a caller profile according to VID into the origin call register. Utilizing the line number, line subscriber profile, VID and caller profile, the context inference service preferably determines a context for the call. The context is preferably transferred to a context logging service. In particular, the context of the call may indicate that the call should be logged for a particular party. Context based logging may be initiated for a particular party according to context based logging preferences accessed according to the context of the call (step S10).

The call context is preferably filtered according to the recipients of the context and transferred to the origin central office (step S11). In addition, if the call is being recorded, in addition to a logging of the context of the call, then a recording indicator may be transferred with the call context. Further, call context may indicate the parties who have requesting to log the call context, such that parties to the call may authorize the logging or block the logging, if desired.

Next, the context is loaded into the call register (step S12) and may be distributed to other entities. Additionally, the context may be filtered by the origin central office depending on filtering preferences for the service provider hosting the origin central office.

A destination service provider for the call according to the dialed digits is determined from a directory (step S13). Next, the call is transferred to the destination service provider with filtered context (step S14).

Upon receiving a call at a destination service provider central office, a call register is established for the call and the line subscriber profile request is initiated to a SCP or external network database (step S15). The line subscriber profile is returned to the central office (step S16) and loaded into the call register (step S17).

Next, a ring signal is extended to the destination device (step S18). If the call is answered, a pickup signal is returned to the destination central office (step S19). In response to detecting the pickup, a call authentication service request is initiated (step S20). The identity of the callee is preferably authenticated by an IP or telco application server and returned as a RVID to the destination central office (step S21).

Thereafter, the destination central office extends a call context request to the context inference service at an IP or telco application server to further determine the context of the call and transfer the context to a call logging service within an IP or telco application server (step S22). The context inference service preferably determines context for the call from the recipient side of the call. In addition, the context inference service may determine context from the call in view of both the origination and reception sides of the call. The context is preferably transferred to a context logging service that initiates logging the call context, continues to log the call context, and/or starts logging the call context for another party (step S23). The call context is preferably filtered according to caller and callee preferences, returned to the destination central office (step S24) and loaded into the call register (step S25). The filtered call context may also indicate whether logging/recording is occurring for the call.

The filtered call context is preferably transmitted via the signal channel to the destination device (step 26). In particular, the call context is preferably filtered for the callee to indicate the caller and the context of the caller's call request. While in the present example, call context information is transmitted to the destination device after determining call context for the callee, in alternate embodiments, call context may be transmitted to the callee at different points during the call as context is available. For example, the VID and device identity may be transmitted with a ring signal to the destination device, such that the callee is informed of who is calling and what device is calling before answering. In addition, complete context information may be transmitted after the call context for both sides of the call has been determined. Moreover, during a call, call context may continue to be inferred and transmitted to the destination device and updated in the context based logging for the call, such as a changing location of the caller.

The filtered call context is also preferably transmitted via the signal channel back to the origin device (step S27). In particular, the call context is preferably filtered for the caller to indicate the callee and the context of the callee answering the call. While in the present invention the RVID is transmitted as part of the filtered call context, in alternate embodiments the RVID may be transferred after determined.

As an alternative to initiating the context inference service from both the origin central office and the destination central office, only the destination central office may initiate the context inference service for determining a call context based on all the profile and identity information collected at the origin central office and destination central office.

The call is then processed to facilitate communications between the origin device and a destination device accessed in association with the dialed digits (step S28). In particular, processing the call also includes monitoring the call to determine additional call context for storage in association with the call and context updates provided to the caller and callee.

Figure 6:
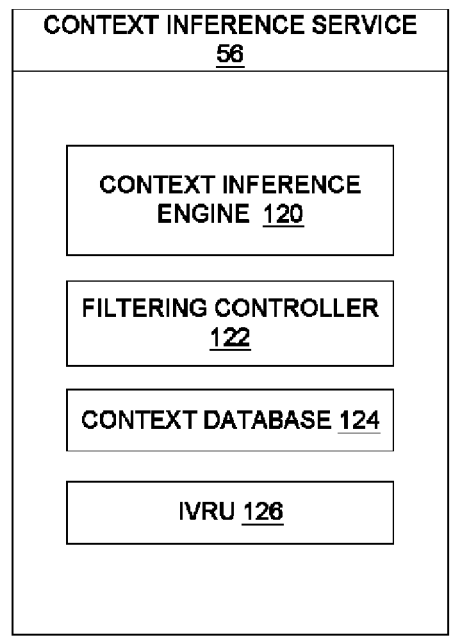
FIG. 6 illustrates a block diagram of a context inference service in accordance with the method, system, and program of the present invention.

Referring now to FIG. 6, there is illustrated a block diagram of a context inference service in accordance with the method, system, and program of the present invention. Context inference service 56 is preferably housed within a computing system including at least a processor, memory, system software, application software, and network software that execute to provide a telco service.

In particular, context inference service 56 includes a context inference engine 120. Context inference engine 120 preferably determines the context for a call through information accessible for the call and through inferences from that information. In addition, context inference engine 120 may filter context information for each entity receiving that information.

A context filtering controller 122 preferably filters context information according to caller and callee filtering preferences. Caller and callee filtering preferences are preferably accessible in caller and callee profiles accessible according to VID and RVID.

A context database 124 preferably records and stores context for each call processed by context inference service 56. Context database 124 may be accessed by context inference engine 120 or context based backup controller 122 when determining context and context backups, according to previous context.

An interactive voice recognition unit (IVRU) 126 preferably prompts the caller and callee to provide information required for determining context and detects caller or callee entries. In addition, IVRU 126 preferably prompts the caller and callee to select from among multiple context based backups and detects selections.

Figure 7:
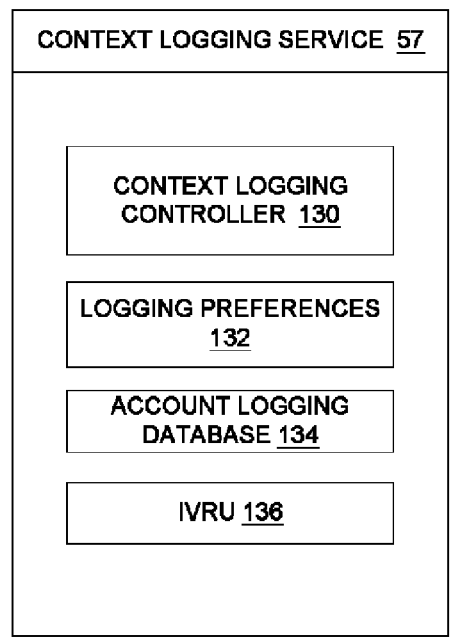
FIG. 7 depicts a a block diagram of a context logging service in accordance with the method, system, and program of the present invention.

With reference now to FIG. 7, there is depicted a block diagram of a context logging service in accordance with the method, system, and program of the present invention. Context logging service 57 is preferably housed within a computing system including at least a processor, memory, system software, application software, and network software that execute to provide a telco service. While in the present invention context inference service 56 and context logging service are depicted as independent services, in alternate embodiments, the services may be integrated into a single service.

In particular, context logging service 57 includes a context logging controller 130. Context logging controller 130 preferably filters logging preferences 132 according to context received from context inference service 156 to determine logging preferences that include at least portions of the call context. Logging preferences 132 may include logging preferences from multiple parties designated according to the context of a call. Logging preferences 132 may be accessed from caller profiles, callee profiles, business profiles, government profiles, and profiles accessible for other identifiable entities.

Context logging controller 130 preferably filters and controls call context stored in an account logging database 134. Account logging database 134 preferably contains call context records stored according to the party requesting the context logging. In addition, where a recording of the call is made, the sound file of the recording is attached to the context stored in account logging database 134.

An interactive voice recognition unit (IVRU) 126 preferably may prompt a caller or callee to consent to logging of the call context and/or recording of the call according to the call context. In addition, IVRU 126 may prompt callers and callees of call context logging and call recording and identify the parties logging and recording the call.

Figure 8:
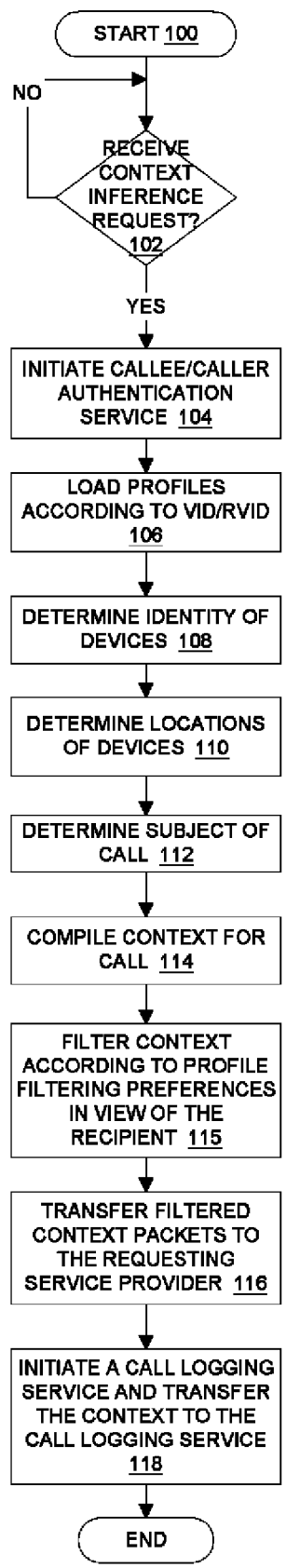
FIG. 8 illustrates a high level logic flowchart of a process and program for determining call context in accordance with the present invention.

Referring now to FIG. 8, there is illustrated a high level logic flowchart of a process and program for determining call context in accordance with the present invention. As depicted, the process starts at block 100 and thereafter proceeds to block 102. Block 102 illustrates a determination as to whether a call context request is received. If a call context request is not received, then the process iterates at block 102. If call context request is received, then the process passes to block 104. A call context request may also include line subscriber profile information and other call information already loaded by the requesting service provider.

Block 104 depicts initiating a caller/callee identity authentication service. Next, block 106 illustrates loading profiles according to the VID/RVID authenticated for the caller/callee. Alternatively, VID/RVID for the call may be transferred with the call context request.

Next, block 108 illustrates determining the identity of any devices utilized in the call. Where a server enables a call from an individual telephone device, the identities of the individual telephone device and the server are preferably determined. Device identity may be determined from the line subscriber identity, a device identity output by the device, the type of service subscribed to for the device, and other available profile information.

Block 110 depicts determining the locations of any devices utilized in the call. Location may be precisely detected from a GPS coordinate. Alternatively, location may be inferred within a general area according to the geographical area covered by an office switch or a wireless tower originating or terminating the call. Further, location may be determined by the physical address assigned to a line number.

Block 112 illustrates determining the subject matter of a call. Subject matter may be inferred, for example, from services subscribed to by the caller/callee, from previous subject matter of calls between the parties, from the location of the calling party, or from the device identities. In addition, a party to a call may be prompted to indicate the subject matter of a call.

Thereafter, block 114 depicts compiling the context information for a call. In compiling context information, the information utilized to determine context is preferably consolidated into general context categories. In addition, block 115 illustrates filtering the context information for a call according to caller and callee profile preferences. Next, block 116 illustrates transferring the call context to the requesting service provider.

Block 118 depicts initiating a call logging service and transferring the call context to the call logging service, and the process ends. In particular, a caller or callee profile may indicate call logging preferences that are included in the context transferred to the call logging service. Alternatively, the call logging service may access call logging preferences for the caller, callee, or third party.

Figure 9:
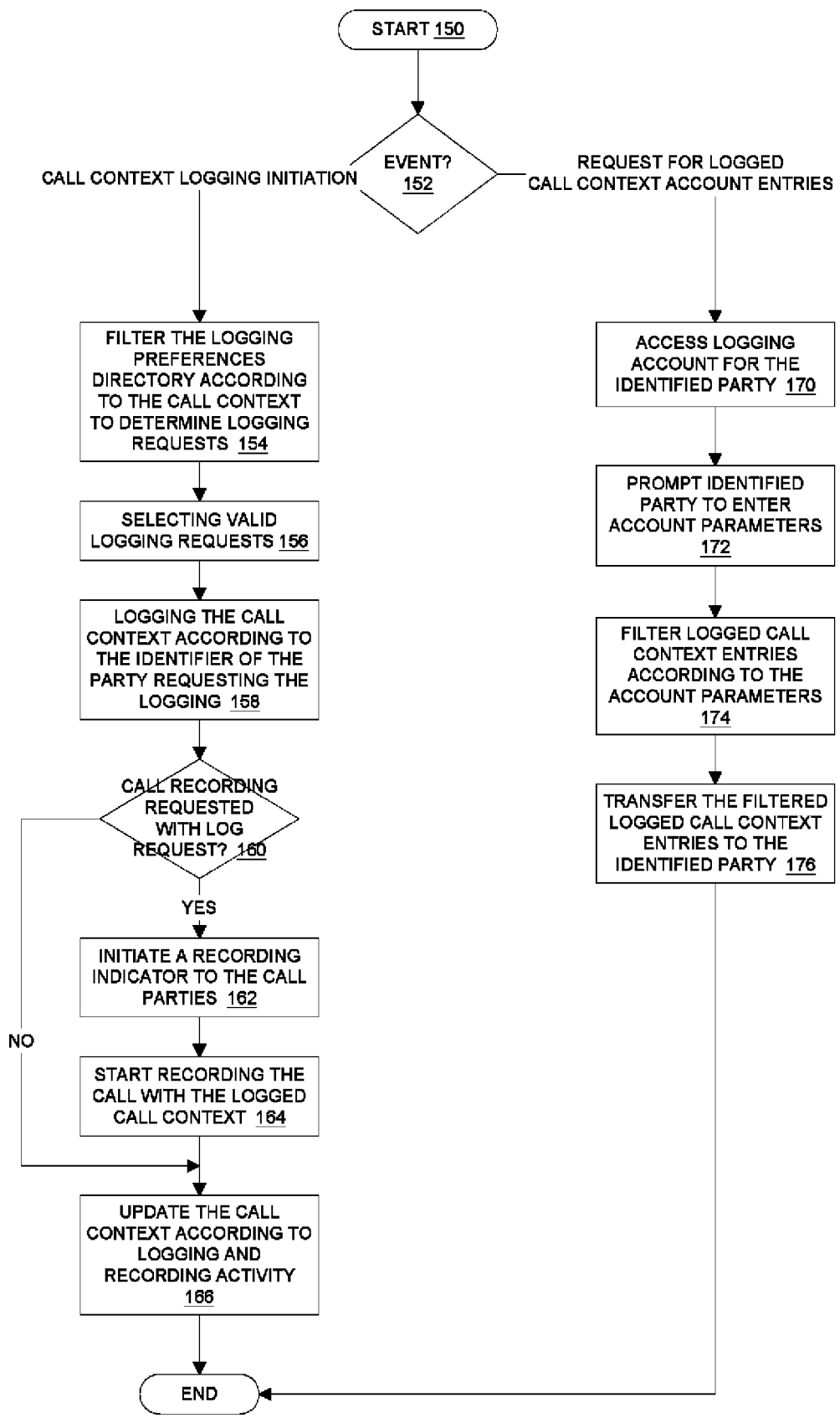
FIG. 9 depicts a high level logic flowchart of a process and program for controlling a call logging service in accordance with the present invention.

Referring now to FIG. 9, there is depicted a high level logic flowchart of a process and program for controlling a call logging service in accordance with the present invention. As illustrated, the process starts at block 150 and thereafter proceeds to block 152. Block 152 depicts a determination as to what event occurred when an event occurs. If a call context logging initiation is received, then the process passes to block 154. If a request for logged call context account entries is received, then the process passes to block 170.

Block 152 depicts a determination as to whether a call context and logging initiation request is received. If a call context and an initiation are received, then the process passes to block 154.

Block 154 depicts filtering the logging preferences directory according to the call context to determine relevant logging requests. Next, block 156 illustrates selecting valid logging requests from among the relevant logging requests. In particular, relevant logging requests may be those requests that include portions of the call context in logging criteria. Valid logging requests are those where the context fully meets the logging preference criteria.

Block 158 illustrates logging the call context according to the identifier of the party requesting the logging. Where multiple parties request logging according to the call context, the context is logged according to the identifier of each party. Parties requesting logging may include parties to the call and third parties, such as a business entity, government, or parental guardian. Logging call context for a call, provides a receipt for the call that indicates not only the line numbers accessed, but the parties to the call, the subject matter of the call, the location of the parties making the call, billed services requested during a call, tariffs applied during the call, orders placed during the call, and other information pertaining to transactions that occur during a call.

Next, block 160 depicts a determination as to whether a call recording is included in the log request. If a call recording is not included in the log request, then the process passes to block 166. If a call recording is included in the log request, then the process passes to block 162. Block 162 illustrates initiating a recording indicator to the call parties. The indicator may include a text or audio output to the parties indicating the party requesting the recording. Next, block 164 illustrates recording the call with the logged call context. Then, block 166 depicts updating the call context according to the logging and recording activity, and the process ends. In particular, the call context may be updated in the context available at the context inference engine, service providers and parties to the call.

Responding to a request for logged call context account entries, block 170 illustrates accessing the logging account for the identified requesting party. In particular, the request for entries may be selected by the party. However, a party may also designate preferences for dates when an entry request should automatically be placed and the parameters of that request. In the case where the parameters of a request are not automatically provided, block 172 depicts prompting the identified party to enter account parameters. Account parameters preferably indicate parameters for the selection of entries that should be output for the request. Parameters may include dates, times, call parties, and other context based criteria.

Next, block 174 illustrates filtering the logged call context entries according to the account parameters. Thereafter, block 176 depicts transferring the filtered logged call context entries to the identifier party as a call context receipt, and the process ends. The filtered logged call context entries may be transferred to a telephony device, a computing system, a printer, or other device enabled to output the entries.

With reference now to FIG. 10, there is illustrated an illustrative embodiment of a call context receipt in accordance with the method, system, and program of the present invention. As depicted, a call context receipt 180 includes multiple call context entries. In particular, call context receipt 180 is requested for ABusiness C@. For the example, ABusiness C@ has a logging preference that requests context logging for calls with a context that includes an employee VID or RVID and has a subject that indicates the call is a business call. The parameters requested for call context receipt 180 include business subject calls logged to employee AJane Marks@ in January 2002.

A first example includes AJane Marks@ as the caller and indicates the subject of the call relating generally to business and specifically to project A. A second example includes AJane Marks@ as the on behalf of caller, where Tish Johnson has placed a call on behalf of Jane Marks. The context includes a record of an order that was placed and the billing for that order, related to project A. A third example includes AJane Marks@ as the callee, where the caller is billed for the cost of the wireless device utilized by AJane Marks@. The subject is in general, and more specifically relates to proposal C.

Advantageously, the example shows that an employee may utilize multiple telephony devices for business calls, including personal telephony devices, and the employer may receive a record of the context of those calls and who was billed for the calls. In addition, the example shows that an employer may track the telephone and order related charges incurred by employees according to the context of the call and the employer is informed of the other party to the call with an employee. Another advantageous parameter may include calls placed by employees on behalf of the company, such that the company is able to monitor business done on its behalf.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for controlling call logging, comprising:
   detecting a context for a call;
   accessing at least one context based logging request valid for said context for said call; and
   logging said context according to said context based logging request;
   wherein the context for a call includes at least one from among an authenticated identity of a caller and an origin device identity and device owner, an authenticated identity of a callee and an destination device identity and device owner, a location of the caller and billing information for the caller, a location of the callee and billing information for the callee, a subject matter of the call, a context of previous calls between the caller and the callee, and the path of the call.

2. The method for controlling call logging according to claim 1, wherein said context is detected from a context inference service executing within a trusted telephone network.

3. The method for controlling call logging according to claim 1, wherein said context is detected from a context inference service executing outside a trusted telephone network accessible via a network.

4. The method for controlling call logging according to claim 1, wherein detecting a context for a call further comprises:
   detecting a plurality of context clues for a call; and
   identifying a context for said call from said plurality of context clues.

5. The method for controlling logging according to claim 4, wherein identifying a context further comprises:
   inferring from said context clues at least one from among who is placing said call, who is receiving said call, whether said call is behalf of another, whether a backup party is accessed, at least one device utilized for said call, a location of said at least one device utilized for said call, a billing plan for said call, a path of line numbers accessed during said call, and a subject matter of said call.

6. The method for controlling call logging according to claim 1, wherein said at least one context based logging request is requested by at least one from among a party to said call, a party called on behalf of said call, a third party, and a guardian of a party to said call.

7. The method for controlling call logging according to claim 1, wherein said at least one context based logging request identifies at least one context based criteria for logging said context of said call.

8. The method for controlling call logging according to claim 1, further comprising:
   recording said call according to said context based logging request.

9. The method for controlling call logging according to claim 8, further comprising:
   notifying at least one party to said call that said call is being recorded.

10. The method for controlling call logging according to claim 1, further comprising:
    notifying at least one party to said call that said context for said call is being logged.

11. The method for controlling call logging according to claim 1, further comprising:
    notifying at least one party to said call of a designated party for which said context is being logged.

12. The method for controlling call logging according to claim 1, further comprising:
    responsive to detecting an update to said context during said call, updating said logging of said context.

13. The method for controlling call logging according to claim 1, farther comprising:
    controlling output of said logged context to a party making said logged context request.

14. The method for controlling call logging according to claim 1, further comprising:
    filtering a plurality of context based logging requests for a plurality of parties according to said context;
    detecting a selection of said plurality of context based logging request that are relevant for said context; and
    determining said at least one context based logging request that is valid for said context for said call.

15. A system for controlling call logging, comprising:
- a logging controller communicatively connected to a trusted telephone network; and
- a computer processor coupled to computer memory, the computer memory including computer program instructions that, upon being executed by the computer processor, carry out the steps of:
- detecting a context for a call at said logging controller;
- accessing at least one context based logging request valid for said context for said call; and
- logging said context according to said context based logging request,
- wherein the context for a call includes at least one from among an authenticated identity of a caller and an origin device identity and device owner, an authenticated identity of a callee and an destination device identity and device owner, a location of the caller and billing information for the caller, a location of the callee and billing information for the callee, a subject matter of the call, a context of previous calls between the caller and the callee, and the path of the call.

16. The system for controlling call logging according to claim 15, wherein said context is detected from a context inference service executing within said trusted telephone network.

17. The system for controlling call logging according to claim 15, wherein said context is detected from a context inference service executing outside said trusted telephone network accessible via a network.

18. The system for controlling call logging according to claim 15, wherein said detecting a context for a call further comprises:
- detecting a plurality of context clues for a call; and
- identifying a context for said call from said plurality of context clues.

19. The system for controlling call logging according to claim 18, wherein said identifying a context further comprises:
- inferring from said context clues at least one from among who is placing said call, who is receiving said call, whether said call is behalf of another, whether a backup party is accessed, at least one device utilized for said call, a location of said at least one device utilized for said call, a billing plan for said call, a path of line numbers accessed during said call, and a subject matter of said call.

20. The system for controlling call logging according to claim 15, wherein said at least one context based logging request is requested by at least one from among a party to said call, a party called on behalf of said call, a third party, and a guardian of a party to said call.

21. The system for controlling call logging according to claim 15, wherein said at least one context based logging request identifies at least one context based criteria for logging said context of said call.

22. The system for controlling call logging according to claim 15, further comprising computer program instructions that, upon being executed by the computer processor, carry out the step of:
- recording said call according to said context based logging request.

23. The system for controlling call logging according to claim 22, further comprising computer program instructions that, upon being executed by the computer processor, carry out the step of:
- notifying at least one party to said call that said call is being recorded.

24. The system for controlling call logging according to claim 15, further comprising computer program instructions that, upon being executed by the computer processor, carry out the step of:
- notifying at least one party to said call that said context for said call is being logged.

25. The system for controlling call logging according to claim 15, further comprising computer program instructions that, upon being executed by the computer processor, carry out the step of:
- notifying at least one party to said call of a designated party for which said context is being logged.

26. The system for controlling call logging according to claim 15, further comprising computer program instructions that, upon being executed by the computer processor, carry out the step of:
- responsive to detecting an update to said context during said call, updating said logging of said context.

27. The system for controlling call logging according to claim 15, further comprising computer program instructions that, upon being executed by the computer processor, carry out the step of:
- controlling output of said logged context to a party making said logged context request.

28. The system for controlling call logging according to claim 27, further comprising computer program instructions that, upon being executed by the computer processor, carry out the step of:
- filtering a plurality of context based logging requests for a plurality of parties according to said context;
- detecting a selection of said plurality of context based logging request that are relevant for said context; and
- determining said at least one context based logging request that is valid for said context for said call.

29. The computer program product for controlling call logging according to claim 27, further comprising computer program instructions recorded on the recording medium that, upon being executed, cause a computer to carry out the steps of:
- filtering a plurality of context based logging requests for a plurality of parties according to said context;
- detecting a selection of said plurality of context based logging request that are relevant for said context; and
- determining said at least one context based logging request that is valid for said context for said call.

30. A computer program product for controlling call logging, comprising a recording medium and computer program instructions recorded on the recording medium that, upon being executed, cause a computer to carry out the steps of:
- detecting a context for a call;
- accessing at least one context based logging request valid for said context for said call; and
- logging said context according to said context based logging request,
- wherein the context for a call includes at least one from among an authenticated identity of a caller and an origin device identity and device owner, an authenticated identity of a callee and an destination device identity and device owner, a location of the caller and billing information for the caller, a location of the callee and billing information for the callee, a subject matter of the call, a context of previous calls between the caller and the callee, and the path of the call.

31. The computer program product for controlling call logging according to claim 30, further comprising computer program instructions recorded on the recording medium that, upon being executed, cause a computer to carry out the steps of:
  detecting a plurality of context clues for a call; and
  identifying a context for said call from said plurality of context clues.

32. The computer program product for controlling call logging according to claim 30, further comprising computer program instructions recorded on the recording medium that, upon being executed, cause a computer to carry out the steps of:
  recording said call according to said context based logging request.

33. The computer program product for controlling call logging according to claim 30, further comprising computer program instructions recorded on the recording medium that, upon being executed, cause a computer to carry out the steps of:
  notifying at least one party to said call that said call is being recorded.

34. The computer program product for controlling call logging according to claim 30, further comprising computer program instructions recorded on the recording medium that, upon being executed, cause a computer to carry out the steps of:
  notifying at least one party to said call that said context for said call is being logged.

35. The computer program product for controlling call logging according to claim 30, further comprising computer program instructions recorded on the recording medium that, upon being executed, cause a computer to carry out the steps of:
  notifying at least one party to said call of a designated party for which said context is being logged.

36. The computer program product for controlling call logging according to claim 30, further comprising computer program instructions recorded on the recording medium that, upon being executed, cause a computer to carry out the steps of:
  updating said logging of said context according to an updated to said context during said call.

37. The computer program product for controlling call logging according to claim 30, further comprising computer program instructions recorded on the recording medium that, upon being executed, cause a computer to carry out the steps of:
  controlling output of said logged context to a party making said logged context request.

38. A method for controlling call receipts, comprising:
  logging a context entry of a call for a particular party according to said context meeting a context criteria of a logging request; and
  responsive to a request by said particular party, controlling output of said logged context entry to said particular party as a receipt for said call,
  wherein the context entry for a call includes at least one from among an authenticated identity of a callee and an destination device identity and device owner, a location of the callee and billing information for the callee, a subject matter of the call, a context of previous calls between the caller and the callee, and the path of the call.

39. The method for controlling call receipt according to claim 38, wherein said request comprises at least one parameter for selecting said context entry.

40. The method for controlling call receipt according to claim 38, wherein said logged context entry is output to at least one from among a telephony device, a computing system, or a printer.

41. A system for controlling call receipts, comprising a computer processor coupled to computer memory, the computer memory including computer program instructions that, upon being executed by the computer processor, carry out the steps of:
  logging a context entry of a call for a particular party according to said context meeting a context criteria of a logging request; and
  responsive to a request by said particular party, controlling output of said logged context entry to said particular party as a receipt for said call,
  wherein the context entry for a call includes at least one from among an authenticated identity of a callee and an destination device identity and device owner, a location of the callee and billing information for the callee, a subject matter of the call, a context of previous calls between the caller and the callee, and the path of the call.

42. The system for controlling call receipt according to claim 41, wherein said request comprises at least one parameter for selecting said context entry.

43. The system for controlling call receipt according to claim 41, wherein said logged context entry is output to at least one from among a telephony device, a computing system, or a printer.

44. A computer program product for controlling call receipts, comprising a recording medium and computer program instructions recorded on the recording medium that, upon being executed, cause a computer to carry out the steps of:
  logging a context entry of a call for a particular party according to said context meeting a context criteria of a logging request; and
  controlling output of said logged context entry to a requesting party as a receipt for said call,
  wherein the context entry for a call includes at least one from among an authenticated identity of a callee and an destination device identity and device owner, a location of the callee and billing information for the callee, a subject matter of the call, a context of previous calls between the caller and the callee, and the path of the call.

* * * * *